(12) United States Patent
Roth et al.

(10) Patent No.: US 9,483,667 B1
(45) Date of Patent: Nov. 1, 2016

(54) DIP CARD READER

(71) Applicant: DIEBOLD SELF-SERVICE SYSTEMS, DIVISION OF DIEBOLD, INCORPORATED, North Canton, OH (US)

(72) Inventors: Doug Roth, Bolivar, OH (US); James E. Pettitt, Canton, OH (US); Andrew Ruszin, New Philadelphia, OH (US)

(73) Assignee: Diebold Self-Service Systems division of Diebold, Incorporated, North Canton, OH (US)

(*) Notice: Subject to any disclaimer, the term of this patent is extended or adjusted under 35 U.S.C. 154(b) by 0 days.

(21) Appl. No.: 14/793,120

(22) Filed: Jul. 7, 2015

(51) Int. Cl.
G06K 7/00 (2006.01)
G06K 7/08 (2006.01)

(52) U.S. Cl.
CPC ............. G06K 7/0004 (2013.01); G06K 7/084 (2013.01)

(58) Field of Classification Search
USPC ........ 235/440, 475, 478, 486, 379, 380, 383
See application file for complete search history.

(56) References Cited

U.S. PATENT DOCUMENTS

| | | | | |
|---|---|---|---|---|
| 2001/0052546 A1* | 12/2001 | Imai | ........................ | G06K 13/08 235/482 |
| 2002/0170957 A1* | 11/2002 | May | ..................... | G06K 7/0004 235/380 |
| 2005/0139652 A1* | 6/2005 | Iwamura | ............... | G06K 7/0004 235/380 |
| 2006/0157565 A1* | 7/2006 | Shiomi | ................ | G06K 7/0004 235/440 |
| 2007/0080231 A1* | 4/2007 | Tadamasa | ............ | G06K 7/0004 235/475 |
| 2010/0038429 A1* | 2/2010 | Orii | ...................... | G06K 13/085 235/483 |
| 2010/0170949 A1* | 7/2010 | Ishikawa | ............ | G06K 13/0875 235/439 |
| 2013/0026218 A1* | 1/2013 | Miller | .................. | G06K 7/0004 235/375 |
| 2013/0299574 A1* | 11/2013 | Theobald | ............... | G06Q 20/34 235/380 |
| 2014/0001264 A1* | 1/2014 | Babu | .................... | G06F 1/3287 235/440 |

OTHER PUBLICATIONS

FIS Global: "EMV Extra Edition Milwaukee Debit Edition" p. 1 and p. 6.

* cited by examiner

*Primary Examiner* — Tuyen K Vo
(74) *Attorney, Agent, or Firm* — Black, McCuskey, Souers & Arbaugh, LPA

(57) ABSTRACT

In accordance an example embodiment, there is disclosed herein a card reader having an opening allowing for card to be inserted. The card reader determines how long a card has been inserted into the card reader. If a card is inserted into the card reader for a time period greater than a predetermined time period, the card reader reads a chip on the card to obtain card data. If the card is removed from the card reader before the predetermined time period, the card reader obtains the card data from a magnetic stripe on the card.

16 Claims, 3 Drawing Sheets

DIP CARD READER

TECHNICAL FIELD

The present disclosure relates generally to Dip card readers where a user manually inserts the card by pushing the card into the card reader and removes the card by pulling the card from the card reader.

BACKGROUND

Dip card readers are popular with end user device's such as automated banking machines, such as an Automated Teller Machine ("ATM") or point of sale ("POS") devices. European Master Card and Visa (EVM) cards were introduced to protect against "skimming." EMV cards employ a chip for conducting a transaction. However, card readers need to be able to distinguish between EMV cards and legacy magnetic stripe ("mag stripe") cards in a manner that is seamless to the end user.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
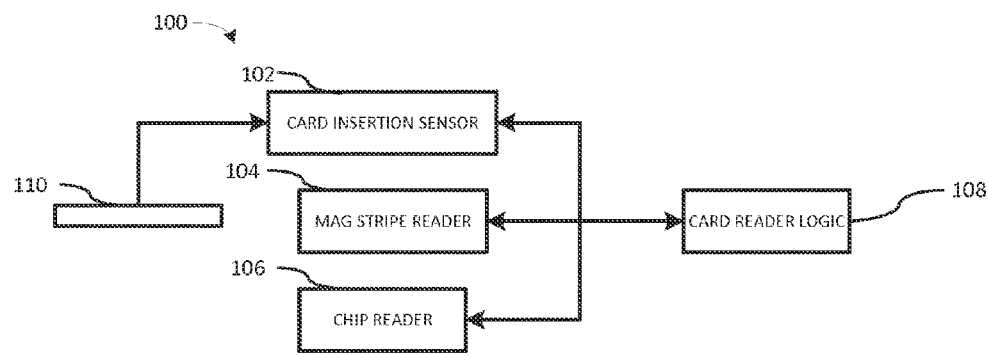
FIG. 1 is a block diagram illustrating an example of a card reader in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a card reader having an opening allowing for card to be inserted, a card insertion sensor operable to detect when cards are inserted into the card reader, a magnetic stripe reader operable to read a magnetic stripes from the cards when they are moved from the card reader, a chip reader operable to read chip data from cards having a chip, and card reader logic coupled with the card insertion sensor, the magnetic stripe sensor, and the chip reader. The card reader logic is operable to receive a signal from the card insertion sensor indicating when a card is inserted into the card reader. The card reader logic is operable to obtain card data from the chip reader for cards that have a chip and have been inserted into the card reader for a time period that is greater than a predetermined threshold. The card reader logic is operable to obtain card data from the magnetic stripe reader for cards that have not inserted into the card reader for a time period greater than the predetermined threshold.

In accordance with an example embodiment, there is disclosed herein a tangible, non-transitory computer readable medium with instructions encoded thereon for execution by a processor and when executed operable to receive a signal from the card insertion sensor indicating when a card is inserted into a card reader. The instructions are also operable to obtain card data from a chip reader for cards that have a chip and have been inserted into the card reader for a time period that is greater than a predetermined threshold, and obtain card data from the magnetic stripe reader for cards that are not inserted into the card reader for a time period greater than the predetermined threshold.

In accordance with an example embodiment, there is disclosed herein a method comprising determining when cards are inserted into a card reader. The method further comprises obtaining first card data from a chip on a first card via a chip reader responsive to the first having a chip and determining that the first card was inserted into the card reader for a time period that is greater than a predetermined threshold. Card reader data is obtained from a second via a magnetic stripe reader responsive to the second card not being inserted into the card reader for a time period greater than the predetermined threshold.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described herein in an example embodiment is a Dip reader that employs a first read condition that reads a magnetic stripe upon withdrawal of the card, but if the card was inserted into the reader for a time greater than a configurable threshold, the reader switches to another (second) read condition, such as a chip read condition. The threshold can be set to a value long enough to allow the customer to insert the card and then extract it, but short enough that if the card is inserted into the reader for a time period greater than the timeout a second read condition is performed, such as one to two seconds. This allows customers using magnetic stripe cards to continue utilizing the card reader as they have before without any changes, such as the card reader claiming the card, while allowing users of chip cards to experience a quick chip connection without having to remove and reinsert their cards.

FIG. 1 is a block diagram illustrating an example of a card reader 100 in accordance with an example embodiment. The card reader 100 comprises a card insertion sensor 102, mag stripe reader 104, a and chip reader that are coupled with card reader 108. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software that performs the desired functionality when executed by a processor.

In an example embodiment, cards are inserted into the card reader via an opening 110. The card insertion sensor is operable to determine when cards are inserted into the card reader 100 via the card reader opening 110, and provides a signal to the card reader logic 108 indicating when a card is inserted into the card reader. The card insertion sensor 102 may be any type of sensor suitable for detecting when a card is inserted into the card reader 100, thus enabling the card reader logic 108 to determine how long cards have been inserted into the card carder 100. Example types of sensor that can be employed by the card insertion sensor 102 include but are not limited to micro switches, optical sensors, pressure sensor, or a combination of sensors.

In an example embodiment, the card reader logic 108 is operable to obtain card data from the chip reader 106 for cards that have a chip and have been inserted into the card reader 100 for a time period that is greater than a predetermined threshold. The card reader logic 108 is operable to obtain card data from the magnetic stripe reader 104 for cards that have not inserted into the card reader 100 for a time period greater than the predetermined threshold.

In an example embodiment, the card reader logic 108 is operable to prompt for reinsertion of a card with a chip that was removed before the predetermined time period. The prompt may further include instructions to leave the card in the card reader until prompted to remove the card. This can aid in helping a user learn they have a chip card and will help train them to leave the card in the reader.

In an example embodiment, the card reader logic 108 is operable to obtain card reader data from the magnetic stripe reader 104 for cards that do not have a chip that are left in the card reader opening for a time period greater than the predetermined threshold. This can improve the user experience by not having the user reinsert their card if they leave it in the card reader for a time period greater than the predetermined time period.

In an example embodiment, the card reader logic 108 is operable to send card data to a server (now shown). The data may sent via any suitable network link (not shown, see e.g., FIG. 2 or FIG. 3). In particular embodiments, the card data sent to the server is encrypted.

Figure 2:
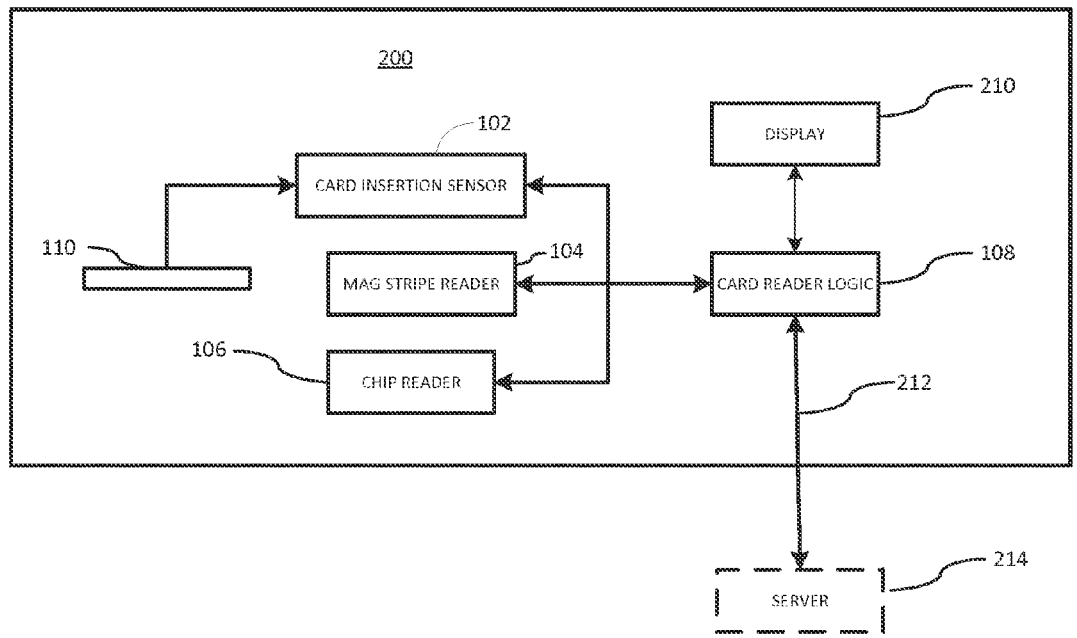
FIG. 2 is a block diagram of a card reader coupled with a display.

FIG. 2 is a block diagram of a card reader 200 coupled with a display 210. The card reader logic 108 is operable to output a message on the display 210 to insert a card when no card is inserted into the card reader opening 110. The card reader logic 108 is operable to output a message on the display 210 to remove a card that has been inserted into the card opening for a time period greater than the predetermined threshold. For example, in particular embodiments, the card reader logic 108 may output a message on the display 210 instructing the user to wait while the card reader logic 108 determines whether the card is a chip card. If the card is a chip card, the user may be instructed to wait until the chip reader 106 has sufficient time to read the chip before instructing the user to remove the card. In an example embodiment. The card reader logic 108 is operable to output a message on the display 210 that prompts for reinsertion of a card with a chip that was removed before the predetermined time period. The card reader logic 108 may send card data to a remote server 214 via a data link 212. The data link 212 may be any suitable wired, wireless, or combination of wired and/or wireless links.

Figure 3:
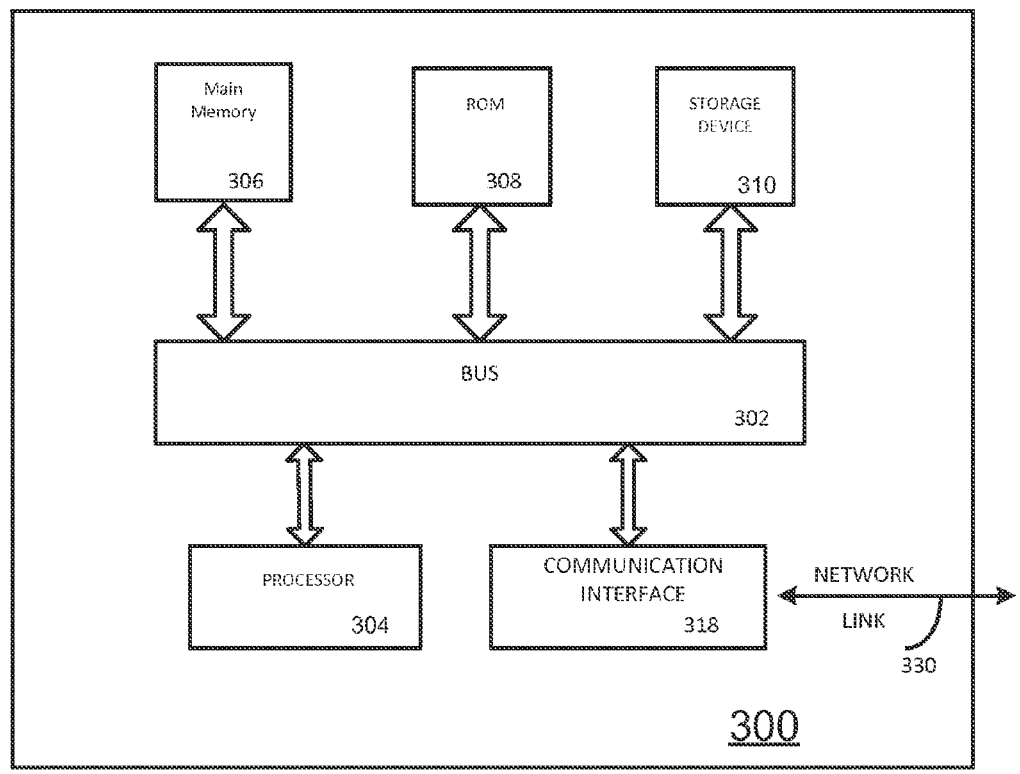
FIG. 3 is a block diagram of a computer system upon which an example embodiment may be implemented.

FIG. 3 is a block diagram of a computer system 300 upon which an example embodiment may be implemented. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

In an example embodiment, computer system 300 may be coupled via bus 302 to a display (not shown, see e.g., FIG. 2) such as a cathode ray tube (CRT) or liquid crystal display (LCD), for displaying information to a computer user. Processor 304 is operable to output data (e.g., textual, graphical or a combination of textual and graphical data).

An aspect of the example embodiment is related to the use of computer system 300 for a Dip card reader. According to an example embodiment, the operation of the Dip card reader is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media. Non-volatile media include for example optical or magnetic disks, such as storage device 310. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

The computer system 300 also includes a communication interface 318 coupled to bus 302. The communication interface 318 provides a two-way data communication coupling computer system 300 to a network link 320 that is connected to a network (not shown). For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information. In an example embodiment, the communication interface is employed by the processor 304 to send card data to an appropriate server or host computer (not shown).

Figure 4:
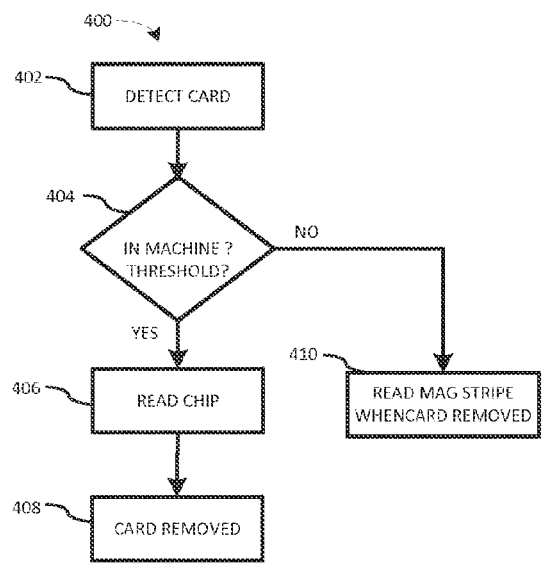
FIG. 4 is a block diagram of a methodology for a card reader to read magnetic stripe cards and magnetic stripe cards with a chip.
Figure 5:
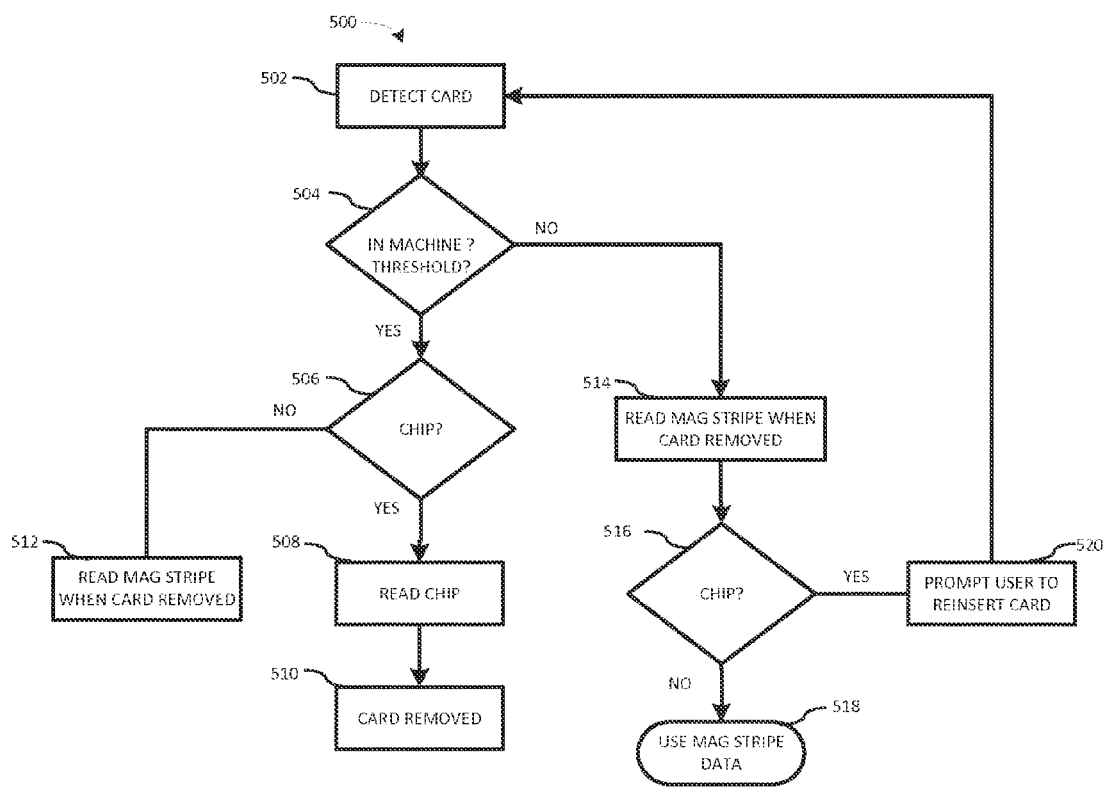
FIG. 5 is a block diagram of a more complex methodology for a card reader to read magnetic stripe cards and magnetic stripe cards with a chip.

In view of the foregoing structural and functional features described above, methodologies in accordance with an example embodiments will be better appreciated with reference to FIGS. 4 and 5. While, for purposes of simplicity of explanation, the methodologies of FIGS. 4 and 5 are shown and described as executing serially, it is to be understood and appreciated that the example embodiments are not limited by the illustrated orders, as some aspects could occur in different orders and/or concurrently with other aspects from that shown and described herein. Moreover, not all illustrated features may be required to implement an example embodiment. The methodologies described herein are suitably adapted to be implemented in hardware, software when executed by a processor, or a combination thereof.

FIG. 4 is a block diagram of a methodology 400 for a card reader to read magnetic stripe cards and magnetic stripe cards with a chip. The methodology 400 may be implemented by either or both of card reader logic 108 (FIGS. 1 and 2) and processor 304 (FIG. 4).

At 402 a card is detected in a card reader. The card may be detected by any suitable type of device which may employ mechanical, electrical, optical, or a combination of sensors.

At 404, a determination is made whether a card has been inserted into the card reader for greater than predetermined time period (or threshold). If the card has been in the card reader greater than the threshold time period (YES), then at 406 the card reader automatically attempts to read a chip on the card. If the card has a chip, card data is read from the chip. If the card does not have a chip, the card data is read from the magnetic stripe when the card is removed at 408.

If however, at 404, the card has not been inserted in the card reader for more than the threshold time period (NO), card data is obtained from the card's magnetic stripe when the card is removed at 410. In an example embodiment, card data may be read by the magnetic stripe reader whenever the card is removed. However, if the card reader determines that the card is a chip card, the card reader will employ the data read by the chip reader and ignore or discard any data read by the magnetic stripe reader.

FIG. 5 is a block diagram of a more complex methodology 500 for a card reader to read magnetic stripe cards and magnetic stripe cards with a chip. The methodology 500 may be implemented by either or both of card reader logic 108 (FIGS. 1 and 2) and processor 304 (FIG. 4).

At 502 a card is detected in a card reader. The card may be detected by any suitable type of device which may employ mechanical, electrical, optical, or a combination of sensors.

At 504, a determination is made whether a card has been inserted into the card reader for greater than predetermined time period (or threshold). If the card has been in the card reader greater than the threshold time period (YES), at 506, the card reader determines whether the card has a chip. If the card is a chip card (YES), the card reader automatically reads the chip at 508. At 510, the card is removed from the card reader.

If at 506, a determination is made that the card does not have a chip (NO), at 512 the card data is obtained from the magnetic stripe when the user removes the card from the card reader. The user does not have to reinsert the card.

If, at 504, the determination is made that the card was removed prior to the threshold time period (NO), the card's magnetic stripe is read when the card is removed from the card reader at 514. At 516, a determination is made whether the card is a chip card.

If, at 516, a determination is made that the card is not a chip card (NO), at 520 the magnetic stripe data read when the card is removed from the card reader is employed. If, at 516, the determination is made that the card was a chip card (YES), at 520 the user is prompted to reinsert the card. Processing then returns to 502 where the methodology 500 waits for a card be inserted.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. An apparatus, comprising:
   a card reader having an opening:
   a card insertion sensor operable to detect when cards are inserted into the card reader via the opening;
   a magnetic stripe reader operable to read a magnetic stripes from the cards when they are moved from the card reader;
   a chip reader operable to read chip data from cards having a chip;
   card reader logic coupled with the card insertion sensor, the magnetic stripe sensor, and the chip reader;
   the card reader logic is operable to receive a signal from the card insertion sensor indicating when a card is inserted into the card reader;
   the card reader logic is operable to employ a first read condition that employs the magnetic stripe reader to read magnetic stripes of cards upon withdrawal of cards that have been inserted into the card reader for a time period that is less than a predetermined time period; and
   the card reader logic is operable to automatically employ a second read condition that obtains card data from the chip reader on cards that remain in the card reader for more than the predetermined time period.

2. The apparatus set forth in claim 1, the card reader logic is operable to send card data to a server.

3. The apparatus set forth in claim 2, wherein the card data sent to the server is encrypted.

4. The apparatus set forth in claim 1, wherein the card reader logic is coupled with a display.

5. The apparatus set forth in claim 4, the card reader logic is operable to output a message on the display to insert a card when no card is inserted into the card reader.

6. The apparatus set forth in claim 5, the card reader logic is operable to output a message on the display to remove a card that has been inserted into the card for a time period greater than the predetermined time period.

7. The apparatus set forth in claim 5, the card reader logic is operable to output a message on the display that prompts for reinsertion of a card with a chip that was removed before the predetermined time period.

8. The apparatus set forth in claim 4, the card reader logic is operable to output a message on the display that prompts for reinsertion of a card with a chip that was removed before the predetermined time period.

9. A tangible, non-transitory computer readable medium with instructions encoded thereon for execution by a processor and when executed operable to:
receive a signal from the card insertion sensor indicating when a card is inserted into a card reader;
employ a first read condition that obtains card data from magnetic stripes from cards that have been withdrawn from the card reader that were inserted in the card reader for a time period that is less than a predetermined time period; and
automatically employ a second read condition that obtains card data from chips on cards that have been inserted into the card reader for a time period greater than the predetermined time period.

10. The computer readable medium set forth in claim 9, the instructions are further operable to send card data to a server.

11. The computer readable medium set forth in claim 10, wherein the card data sent to the host is encrypted.

12. The computer readable medium set forth in claim 9, the instructions are further operable to output data onto a display coupled with the processor.

13. The computer readable medium set forth in claim 12, the instructions are further operable to output a message on the display to insert a card when no card is inserted into the card reader.

14. The computer readable medium set forth in claim 13, the instructions are further operable to output a message on the display to remove a card that has been inserted into the card for a time period greater than the predetermined time period.

15. The computer readable medium set forth in claim 12, the instructions are further operable to output a message on the display that prompts for reinsertion of a card with a chip that was removed before the predetermined time period.

16. A method, comprising:
determining from a sensor when cards are inserted into a card reader;
determining a time period cards remain inserted into the card reader;
employing a first read condition that obtains card data from magnetic stripe reader upon cards withdrawal of cards that have been inserted into the card reader opening for a first time period that is less than a predetermined time period; and
employing a second read condition and obtaining card data from a chip reader for cards that have been inserted and remain inserted into the card reader opening for a second time period that is greater than the predetermined time period.

* * * * *